(12) United States Patent
Jung et al.

(10) Patent No.: US 9,842,234 B2
(45) Date of Patent: Dec. 12, 2017

(54) RFID TAG AUTHENTICATION SYSTEM

(71) Applicant: Soongsil University Research Consortium Techno-Park, Seoul (KR)

(72) Inventors: Souhwan Jung, Seoul (KR); Seung Wook Jung, Seoul (KR); Young Sik Youn, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 24 days.

(21) Appl. No.: 14/983,813

(22) Filed: Dec. 30, 2015

(65) Prior Publication Data
US 2016/0110571 A1 Apr. 21, 2016

Related U.S. Application Data

(63) Continuation of application No. PCT/KR2013/012425, filed on Dec. 31, 2013.

(30) Foreign Application Priority Data

Jul. 2, 2013 (KR) .......................... 10-2013-0077104

(51) Int. Cl.
*G06K 7/10* (2006.01)
*G06F 21/60* (2013.01)
(Continued)

(52) U.S. Cl.
CPC ....... *G06K 7/10257* (2013.01); *G06F 21/602* (2013.01); *G06K 19/07309* (2013.01);
(Continued)

(58) Field of Classification Search
CPC .......... G06K 7/10257; G06K 19/07309; G06F 21/602; G06Q 20/3278; G09C 1/00;
(Continued)

(56) References Cited

U.S. PATENT DOCUMENTS

2004/0066278 A1* 4/2004 Hughes ................... G06F 21/31
340/10.1
2009/0041250 A1* 2/2009 Park ...................... G06F 21/445
380/277
(Continued)

FOREIGN PATENT DOCUMENTS

KR 10-2009-0000058 A 1/2009
KR 10-2009-0065736 A 6/2009
(Continued)

OTHER PUBLICATIONS

International Search Report for PCT/KR2013/012425 dated Apr. 3, 2014.
(Continued)

*Primary Examiner* — George Bugg
*Assistant Examiner* — Thang Tran
(74) *Attorney, Agent, or Firm* — Pearne & Gordon LLP

(57) ABSTRACT

An RFID tag using a physically unclonable function (PUF) generates a response value corresponding to a challenge value, receives an RFID reader ID from an RFID reader, generates a first message authentication code for the RFID reader ID, an RFID tag ID and time information by using, as a secret key, a first response value corresponding to a first challenge value, and transmits, to the RFID reader, the first challenge value, the first message authentication code and the time information of the RFID tag, which are tag identification elements, when the RFID reader ID is received. At this time, the RFID tag shares, with an RFID tag authentication server, the same message authentication code generation function, the RFID tag ID, the first challenge value, and the first response value generated by a PUF module.

13 Claims, 3 Drawing Sheets

(51) Int. Cl.
*G06Q 20/32* (2012.01)
*G06K 19/073* (2006.01)
*H04L 9/32* (2006.01)
*G09C 1/00* (2006.01)
*H04L 9/00* (2006.01)

(52) U.S. Cl.
CPC ............ *G06Q 20/3278* (2013.01); *G09C 1/00* (2013.01); *H04L 9/006* (2013.01); *H04L 9/3263* (2013.01); *H04L 9/3273* (2013.01); *H04L 9/3278* (2013.01); *H04L 2209/805* (2013.01)

(58) Field of Classification Search
CPC ..... H04L 9/006; H04L 9/3263; H04L 9/3273; H04L 9/3278; H04L 2209/805
USPC .......................... 340/10.1–10.6, 572.1–572.9
See application file for complete search history.

(56) References Cited

U.S. PATENT DOCUMENTS

| | | | |
|---|---|---|---|
| 2009/0282259 A1 | 11/2009 | Skoric | |
| 2010/0073147 A1* | 3/2010 | Guajardo Merchan | G06K 19/07309 340/10.51 |
| 2010/0161966 A1* | 6/2010 | Kwon | H04L 9/3273 713/155 |
| 2011/0039585 A1* | 2/2011 | Rouse | G06Q 20/102 455/466 |
| 2012/0204023 A1* | 8/2012 | Kuipers | G06F 21/10 713/150 |
| 2013/0047209 A1* | 2/2013 | Satoh | H04L 9/3278 726/2 |
| 2013/0051552 A1* | 2/2013 | Handschuh | G06F 21/602 380/44 |
| 2014/0215556 A1* | 7/2014 | Shukla | H04L 45/56 726/3 |
| 2014/0301551 A1* | 10/2014 | Adler | H04L 9/0841 380/270 |
| 2015/0143545 A1* | 5/2015 | Falk | H04L 9/3271 726/30 |

FOREIGN PATENT DOCUMENTS

| | | |
|---|---|---|
| KR | 10-2013-0026423 A | 3/2013 |
| KR | 10-2013-0059054 A | 6/2013 |
| WO | 2011/092426 A1 | 8/2011 |

OTHER PUBLICATIONS

Jung, et al., International Conference on Information Networking 2013, Bangkok, Thailand, Jan. 27-30, 2013.

* cited by examiner

RFID TAG AUTHENTICATION SYSTEM

CROSS-REFERENCE TO RELATED APPLICATION

This application is a continuation application of PCT Application No. PCT/KR2013/012425 filed on Dec. 31, 2013, which claims the benefit of Korean Patent Application No. 10-2013-0077104 filed on Jul. 2, 2013, the entire disclosures of which are incorporated herein by reference.

TECHNICAL FIELD

The embodiments described herein pertain generally to a radio frequency identification (RFID) tag, an RFID tag authentication server and a mutual authentication method between the RFID tag and the RFID tag authentication server.

BACKGROUND

A radio frequency identification (RFID) tag is a device that stores product information on a microscopic chip equipped with an antenna and transmits data wirelessly. The RFID tag is a small-sized item such as an adhesive label that can be attached to or integrated to entities or products. The RFID tag includes an electronic chip and an antenna. The electronic chip allows the antenna to receive wireless requests sent from a transceiver called "reader" and to respond to the requests. By way of example, wireless tags are used to identify people when they are attached to passports, tickets or payment cards, or used, like barcodes, to identify products when they are attached to the products. Such application of the RFID cards to the products eases inventory control and enables inventory tracking through a distribution system for the products.

RFID systems are used in a wide variety of fields such as pharmaceutical industry, distribution industry, fashion, book sales, and so forth, for the purposes of tracking products. The RFID technology is getting more increasingly used to automatize manual processes, identify and protect cargos, and provide real-time visibility upon inventory.

By applying the RFID technology to individual processing steps of systems for distributing products for the purposes of accurately tracking the products provided with the wireless tags, investigating authenticity and finding out the sources of the products, counterfeiting can be effectively prevented.

In this regard, Korean Patent Laid-open Publication No. 10-2013-0026423 (entitled "Method for identifying and authenticating RFID tag by reader") describes an authentication method for preventing counterfeiting of an RFID tag.

Since, however, a method capable of identifying RFID tag IDs effectively is yet to be known, an RFID tag authentication server cannot but use a very inefficient method of calculating an unidirectional hash function approximately twice as many times as the number of RFID tags registered on the RFID tag authentication server in order to hide an ID of the RFID tag and protect the privacy thereof.

DISCLOSURE OF THE INVENTION

Problems to be Solved by the Invention

Example embodiments of the present disclosure are conceived to solve the problem of the prior art regarding security issue that an ID of an RFID tag is easily exposed to hackers during communications with an RFID reader.

Furthermore, example embodiments are also conceived to solve the problem of the prior art that a great amount of hash operations need to be performed in order to protect the ID of the RFID.

Means for Solving the Problems

A radio frequency identification (RFID) tag using a physically unclonable function (PUF) is provided herein. The RFID tag may include a PUF module configured to generate a response value corresponding to a challenge value; a storage unit having stored thereon an ID of the RFID tag and a first challenge value; a receiving unit configured to receive an ID of a RFID reader from the RFID reader; a MAC processing unit configured to generate a first message authentication code for the ID of the RFID reader, the ID of the RFID tag and time information of the RFID tag by using a first response value corresponding to the first challenge value as a secret key; and a transmitting unit configured to transmit the first challenge value, the first message authentication code and the time information of the RFID tag as tag identifiers to the RFID reader if the receiving unit receives the ID of the RFID reader, wherein the RFID tag may share a message authentication code generation function, the ID of the RFID tag, the first challenge value and the first response value generated by the PUF module with an RFID tag authentication server, and the RFID tag authentication server may authenticate the RFID tag based on information received from the RFID reader.

The RFID tag may include a decryption unit configured to restore encrypted data; and a verification unit configured to determine whether a message authentication code received from the RFID tag authentication server coincides with a message authentication code generated by the MAC processing unit, wherein the receiving unit may additionally receive a second challenge value encrypted with a second message authentication code in the RFID tag authentication server, a third message authentication code and time information of the RFID tag authentication server from the RFID reader, the MAC processing unit may generate a fourth message authentication code for the time information of the RFID tag, the ID of the RFID reader, the ID of the RFID tag and the time information of the RFID tag authentication server received from the RFID reader by using the first response value as a secret key, the decryption unit may restore, by using the fourth message authentication code, an original second challenge value from the second challenge value encrypted with the second message authentication code by the RFID tag authentication server, the MAC processing unit may generate a fifth message authentication code for the restored second challenge value by using the first response value as a secret key, the verification unit may determine whether the third message authentication code and the fifth message authentication code are coincident, and, if so, updates the second challenge value to the storage unit while matching the second challenge value with the ID of the RFID tag, the second message authentication code may be generated for the time information of the RFID tag authentication server, the time information of the RFID tag, the ID of the RFID reader and the ID of the RFID tag by using the first response value as a secret key, and the third message authentication may be generated for the second challenge value code by using the first response value as a secret key.

The RFID tag may further include an encryption unit configured to encrypt a second response value by using the second challenge value, wherein the PUF module generates the second response value corresponding to the second challenge value, the MAC processing unit may generate a sixth message authentication code for next time information (Tt+1) of the RFID tag, the time information of the RFID tag authentication server, the ID of the RFID reader and the ID of the RFID tag by using the second response value generated by the PUF module as a secret key, and the transmitting unit may transmit the sixth message authentication code and the second response value encrypted with the second challenge value in the encryption unit to the RFID reader.

A radio frequency identification (RFID) tag authentication server is provided herein. The RFID tag may include a storage unit having stored thereon an ID of an RFID tag, a first challenge value and a first response value corresponding to the first challenge value; a receiving unit configured to receive the first challenge value, time information of the RFID tag, an ID of an RFID reader and a first message authentication code from the RFID reader as tag identifiers; a tag identification unit configured to search the storage unit for the ID of the RFID tag and the first response value matched with the first challenge value; a MAC processing unit configured to generate a seventh message authentication code for the ID of the RFID reader, the ID of the RFID tag and time information of the RFID tag by using the first response value as a secret key; and a verification unit configured to determine whether the seventh message authentication code and the first message authentication code are coincident, wherein the first message authentication code may be a message authentication code generated for the ID of the RFID reader, the ID of the RFID tag and the time information of the RFID tag by using the first response value as a secret key, and the RFID tag authentication server may share a message authentication code generation function, the ID of the RFID tag, the first challenge value and the first response value with the RFID tag.

The RFID tag authentication server may further include an encryption unit configured to encrypt preset data; and a transmitting unit configured to transmit the preset data to the RFID reader, wherein the MAC processing unit may additionally generate a second message authentication code and a third message authentication code by using the first response value as a secret key, the encryption unit may encrypt the second message authentication code and the second challenge value, the transmitting unit may transmit the third message authentication code, time information of the RFID tag authentication server and the second message authentication code encrypted in the encryption unit to the RFID reader, the second message authentication code may be a message authentication code for the time information of the RFID tag authentication server, the time information of the RFID tag, the ID of the RFID tag and the ID of the RFID reader, and the third message authentication code may be a message authentication code for a second challenge value to be used next.

The RFID tag authentication server may further include a decryption unit configured to restore preset data into original data, wherein the receiving unit may receive a sixth message authentication code for next time information (Tt+1) of the RFID tag, the time information of the RFID tag authentication server, the ID of the RFID tag and the ID of the RFID reader, and the second response value encrypted with the second challenge value, the decryption unit may restore the second response value encrypted with the second challenge value, the MAC processing unit may generate an eighth message authentication code for the next time information of the RFID tag, the time information of the RFID tag authentication server, the ID of the RFID tag and the ID of the RFID reader by using the restored second response value as a secret key, and the verification unit may determine whether the sixth message authentication code and the eighth message authentication code are coincident, and, if so, updates the second challenge value and the second response value to the storage unit while matching the second challenge value and the second response value with the ID of the RFID tag.

An authentication method of authenticating a radio frequency identification (RFID) tag by an RFID tag authentication server is provided herein. The authentication method may include generating a first challenge value; sharing a message authentication code generation function, an ID of the RFID tag, the first challenge value and a first response value corresponding to the first challenge value between the RFID tag authentication server and the RFID tag; receiving time information of the RFID tag, the first challenge value, an ID of an RFID reader and a first message authentication code from the RFID reader; generating a seventh message authentication code for the time information of the RFID tag, the ID of the RFID tag and the ID of the RFID reader by using the first response value as a secret key; and determining whether to authenticate the RFID tag based on whether the generated seventh message authentication code and the received message authentication code are coincident, wherein the first message authentication code may be a message authentication code generated for the ID of the RFID reader, the ID of the RFID tag and the time information of the RFID tag by using the first response value as a secret value.

The authentication method may further include additionally generating a second challenge value to be used next if the authentication of the RFID tag is determined; updating the second challenge value to the RFID tag authentication server while matching the second challenge value with the ID of the RFID tag, and generating a second message authentication code and a third message authentication code by using the first response value as a secret key, encrypting the second challenge value with the second message authentication code; and transmitting the third message authentication code, the time information of the RFID tag authentication server and the encrypted second challenge value to the RFID reader, wherein the second message authentication code may be a message authentication code for time information of the RFID tag authentication server, the time information of the RFID tag, the ID of the RFID tag and the ID of the RFID reader, and the third message authentication code may be a message authentication code for the second challenge value to be used next.

The authentication method may further include receiving a sixth message authentication code for next time information (Tt+1) of the RFID tag, the time information of the RFID tag authentication server, the ID of the RFID tag and the ID of the RFID reader, and the second response value encrypted with the second challenge value, restoring the second response value encrypted with the second challenge value, generating an eighth message authentication code for the next time information of the RFID tag, the time information of the RFID tag authentication server, the ID of the RFID tag and the ID of the RFID reader by using the restored second response value as a secret key, and determining whether the sixth message authentication code and the eighth message authentication code are coincident, and, if so, updates the second challenge value and the second response value to the storage unit while matching the second challenge value and the second response value with the ID of the RFID tag.

Effect of the Invention

According to the example embodiments, since data is protected by using a PUF response value as a secret key, hackers cannot restore any information. Therefore, the hackers cannot generate the same response value, and the system can be protected safely.

Further, according to the example embodiments, since information of a challenge-response pair (hereinafter, referred to as CRP) is continuously updated, it is possible to overcome the limit of the prior art that the RFID tag authentication server suffers a considerable amount of load because the RFID tag authentication server stores and manages therein a great amount of authentication information.

Furthermore, since an ID of an RFID tag is XOR (exclusive OR)-operated with a challenge value of the PUF module which changes all the time, the ID of the RFID tag can be protected safely from the hackers. On the other hand, since the RFID tag authentication server stores previously the calculated XOR result value, the ID of the RFID tag can be found through a simple operation.

MODE FOR CARRYING OUT THE INVENTION

Figure 1:
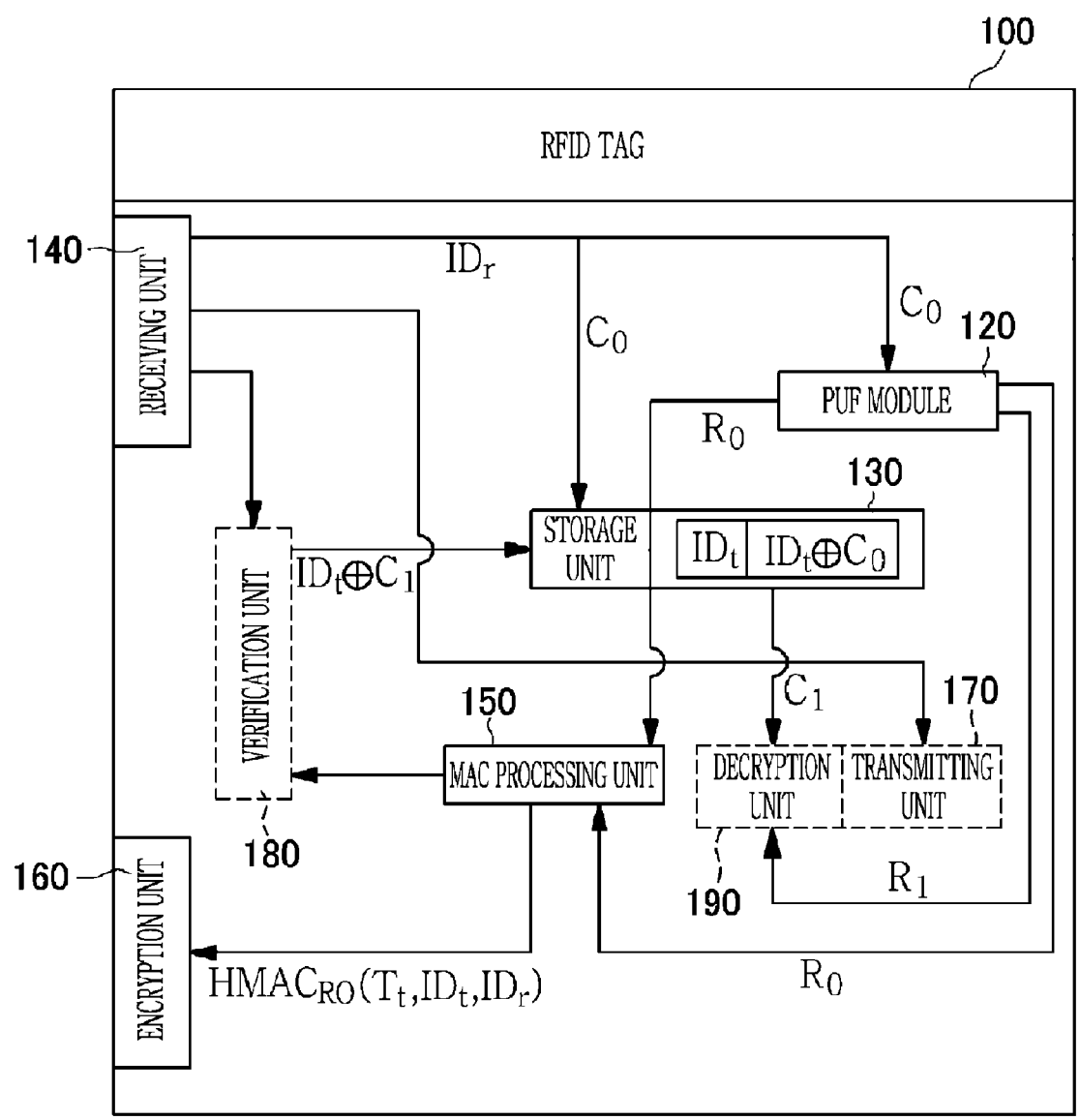
FIG. 1 illustrates a configuration of an RFID tag according to an example embodiment.

Hereinafter, example embodiments will be described in detail so that inventive concept may be readily implemented by those skilled in the art. However, it is to be noted that the present disclosure is not limited to the example embodiments and examples but can be realized in various other ways. In drawings, parts not directly relevant to the description are omitted to enhance the clarity of the drawings, and like reference numerals denote like parts through the whole document.

Through the whole document, the terms "connected to" or "coupled to" are used to designate a connection or coupling of one element to another element and include both a case where an element is "directly connected or coupled to" another element and a case where an element is "electronically connected or coupled to" another element via still another element.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "message authentication code" is for verifying integrity of an ID of an RFID reader and time information. The message authentication code includes a hash function or an HMAC-based message authentication code.

The example embodiments are directed to a safe authentication technology whereby an ID of an RFID tag can be found just by referring to a database (DB) on an RFID tag authentication server without exposing the ID of the RFID tag for the security thereof in an environment where active RFID is used. Conventionally, in order to authenticate an RRID tag without exposing an ID thereof, unidirectional encryption needs to be performed in the RFID tag authentication server twice as many times as the number of RFID tags registered on the RFID tag authentication server. Thus, the performance of the conventional authentication system has been very low, and the cost for the construction of the RFID tag authentication server has been high.

The example embodiments provide a stable authentication technology in which, since an ID of an RFID tag and a constantly changing random number (for example, a challenge value of a physically unclonable function (PUF) are XOR-operated), hackers cannot figure it out. In this inventive method, however, since the RFID tag authentication server stores therein previously calculated XOR result values, it can retrieve the ID of the target RFID tag through a simple matching operation. Further, this authentication technology has advantages in that the size of a transmitted message and an operation amount of tags are not large, as compared to those in the conventional method. Therefore, the example embodiments provide a very efficient authentication method having higher security than the conventional RFID tag authentication method, and, also, capable of minimizing an operation on the side of the RFID tag authentication server.

An RFID tag 100 according to an example embodiment includes a PUF module 120, a storage unit 130, a receiving unit 140, an MAC processing unit 150 and a transmitting unit 170. The RFID tag 100 may further include a decryption unit 190, a verification unit 180 and an encryption unit 160. Here, the RFID tag shares a message authentication code generation function, an ID of the RFID tag, a first challenge value and a first response value generated from the PUF module 120 with the RFID tag authentication server. Here, the first challenge value and the ID of the RFID tag are encrypted (for example, through an XOR operation) and shared by the RFID tags and the RFID tag authentication server. Meanwhile, the PUF module 120, the receiving unit 140, the MAC processing unit 150, the transmitting unit 170, the decryption unit 190, the verification unit 180 and the encryption unit 160 may be implemented by IC chip processors embedded in the RFID tag 100, and the storage unit 130 may be implemented by a memory.

FIG. 1 illustrates a configuration of the RFID tag according to the example embodiment.

First, the PUF module 120 of the RFID tag 100 is configured to generate a response value corresponding to a challenge value. Here, the challenge value is shared by the RFID tag and the RFID tag authentication server.

The PUF module 120 generates a first response value R0 corresponding to a first challenge value C0, and generate a second response value R1 corresponding to a second challenge value C1.

Here, however, there is a big problem in utilizing the PUF module 120 in the authentication technique. That is, since the RFID tag authentication server needs to store and manage a large amount of CRP tables, the RFID tag authentication server may suffer a considerable amount of load inflicted thereon. According to the example embodiment, however, there is provided an efficient method of managing the CRP tables by updating, during a current authentication process, a CRP to be used next time.

The storage unit 130 of the RFID tag 100 previously stores therein the ID of the RFID tag 100 and the first challenge value. The first challenge value is a value shared by the RFID tag 100 and the RFID tag authentication server, and is changed every time the authentication is performed. The first challenge value is used by the RFID tag authentication server to identify the RFID tag 100. According to the present example embodiment, in order to prevent the first challenge value from hackers, the first challenge value is encrypted along with the ID of the RFID tag, and this encrypted first challenge value is previously stored and shared with the RFID tag authentication server. Here, the encryption operation includes an XOR operation. This encryption operation is performed to protect the RFID tag by encrypting the ID of the RFID tag by using a new one-time random number all the time, and to allow the RFID tag authentication server to perform a minimum operation to find out the ID of the RFID tag.

The receiving unit 140 of the RFID tag 100 is configured to receive an ID of an RFID reader from the RFID reader. The ID of the RFID reader servers as an authentication request message, which initiates an authentication process between the RFID tag 100 and the RFID tag authentication server.

The MAC processing unit 150 of the RFID tag 100 is configured to generate a first message authentication code for the ID of the RFID reader, the ID of the RFID tag and time information of the RFID tag 100 by using the first response value corresponding to the first challenge value as a secrete key. According to the example embodiment, the message authentication code generated by the MAC processing unit 150 may be a hash function or a HMAC-based message authentication code. This first message authentication code is generated to verify the integrity of the ID of the RFID reader and the time information.

The transmitting unit 170 of the RFID tag 100 is configured to transmit the first challenge value as a tag identifier, the first message authentication code and the time information of the RFID tag 100 to the RFID reader if the receiving unit 140 receives the ID of the RFID reader as the authentication request message. At this time, the first challenge value and the ID of the RFID tag which are encrypted can be transmitted as the tag identifier. The encryption operation may be an XOR operation.

The RFID tag 100 may further include the decryption unit 190 configured to restore encrypted data; and the verification unit 180 configured to determine whether a message authentication code received from the RFID tag authentication server coincides with the message authentication code generated by the MAC processing unit 150. This verification process is performed to authenticate the RFID tag authentication server in turn after authenticating the RFID tag 100. Further, the message authentication code from the RFID tag authentication server may be a response of the RFID tag authentication server to the authentication request message from the RFID tag 100. At this time, the receiving unit 140 additionally receives, from the RFID reader, a second challenge value encrypted with a second message authentication code sent from the RFID reader, a third message authentication code, and time information of the RFID tag authentication server. Then, the MAC processing unit 150 generates a fourth message authentication code for the time information of the RFID authentication server received from the RFID reader, the time information of the RFID tag 100, the ID of the RFID reader and the ID of the RFID tag by using the first response value as a secret key.

Here, the second message authentication code is a message authentication code generated by the RFID tag authentication server for the time information of the RFID tag authentication server, the time information of the RFID tag 100, the ID of the RFID reader and the ID of the RFID tag by using the first response value as the secret key. Further, the third message authentication code is also generated by the RFID tag authentication server for the second challenge value by using the first response value as the secret key.

The decryption unit 190 is configured to restore the second challenge value, which is encrypted with the second message authentication code by the RFID tag authentication server, by using the fourth message authentication code. According to the example embodiment, in case that the second challenge value and the second message authentication code are encrypted by the RFID tag authentication code through an XOR operation, the second challenge value is restored by XOR-operating the second challenge value, which is encrypted with the second message authentication code, with the fourth message authentication code.

At this time, the MAC processing unit 150 generates a fifth message authentication code for the second challenge value restored by using the first response value as a secret value, and the verification unit 180 determines whether the fifth message authentication code coincides with the third message authentication code. If they are coincident, the second challenge value is updated to the storage unit 130.

Besides, the RFID tag 100 according to the example embodiment may further include the encryption unit 160 to update a challenge value and a response value to be used next to the RFID tag authentication server after the RFID tag authentication server is authenticated.

At this time, the PUF module 120 generates a second response value corresponding to the second challenge value, and the encryption unit 160 encrypts the second response value with the second challenge value. Here, the encryption unit 160 may perform the encryption of the second response value with the second challenge value by XOR-operating them.

Further, a MAC processing unit 150 according to another example embodiment is configured to generate a sixth message authentication code for next time information (Tt+1) of the RFID tag 100, the time information of the RFID tag authentication server, the ID of the RFID reader and the ID of the RFID tag by using the second response value, which is generated by the PUF module 120, as a secret key. As described above, the message authentication code generated by the MAC processing unit 150 may be a hash function or a HMAC-based message authentication code. The sixth message authentication code is generated to verity the integrity of the ID of the RFID reader and the time information.

At this time, the transmitting unit 170 sends the sixth message authentication code and the second response value encrypted with the second challenge value by the encryption unit 160 to the RFID reader. This process is performed to update a response value, which is recorded in a database of the RFID tag 100 stored in the RFID tag authentication server, to the second challenge value and the second response value to be used next. Here, the second challenge value and the second response value may be XOR-operated.

Now, there will be described the RFID tag authentication server for authenticating the RFID tag 100 according to the example embodiment. The RFID tag authentication server includes a storage unit 320, a receiving unit 330, a tag identification unit 340, a MAC processing unit 350 and a verification unit 360. Besides, the RFID tag authentication server may further include an encryption unit 370, a transmitting unit 380 and a decryption unit. Here, the RFID tag authentication server shares a message authentication generation function, an ID of an RFID tag, a first challenge value and a first response value with the RFID tag 100. Here, the first challenge value may be one encrypted with the RFID tag 100 (for example, through XOR operation).

Figure 2:
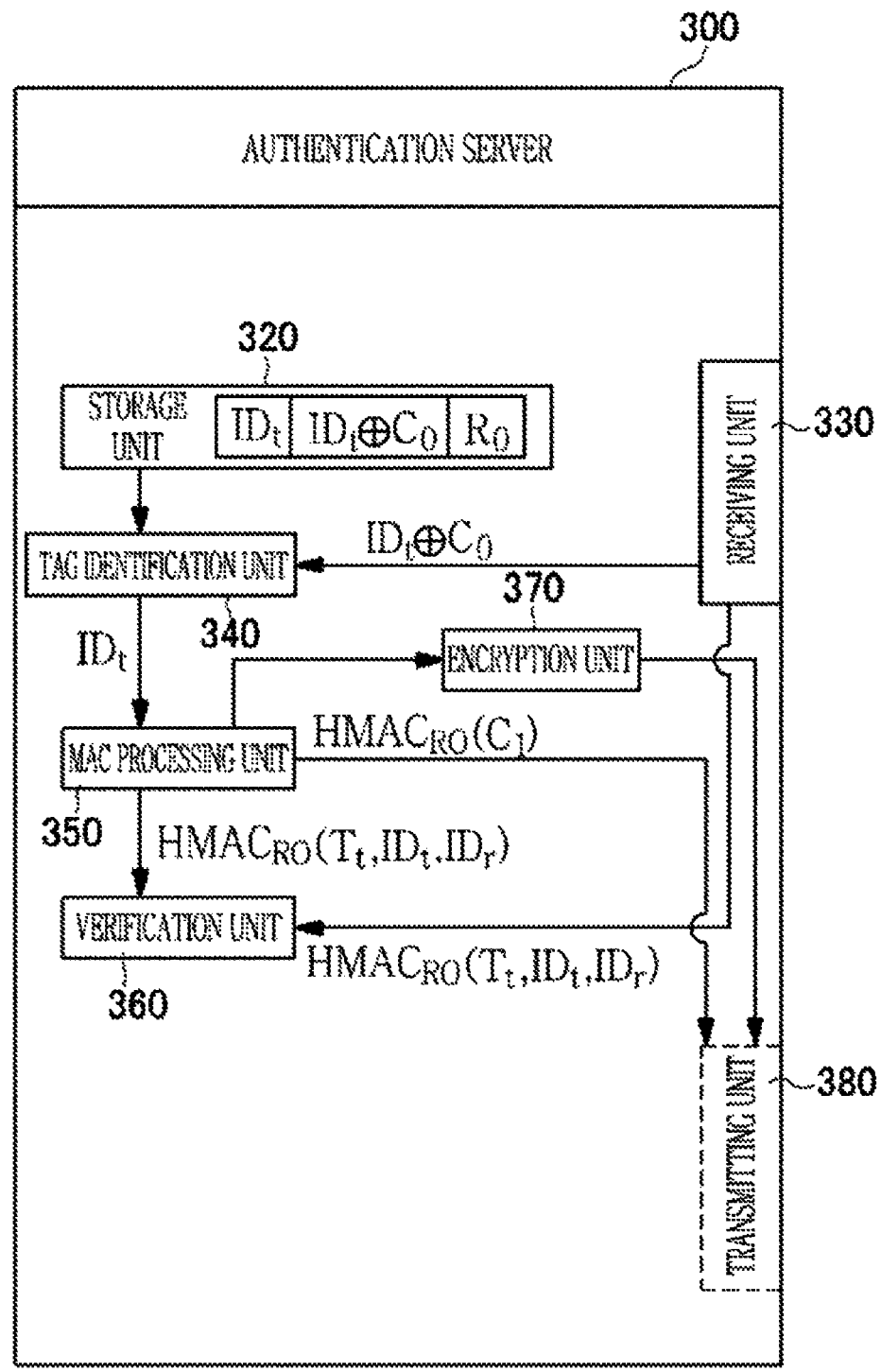
FIG. 2 depicts a configuration of an RFID tag authentication server according to the example embodiment.

FIG. 2 illustrates a configuration of the RFID tag authentication server according to the example embodiment.

A challenge value of an RFID tag is changed every time when authentication is performed, and is shared by the RFID tag and the RFID tag authentication server 300. In order to protect the challenge value from hackers, the challenge value is encrypted with an ID of the RFID tag, and this encrypted challenge value is shared by the RFID tag and the RFID tag authentication server. According to the example embodiment, the challenge value and the ID of the RFID tag may be encrypted by being XOR-operated. A first challenge value and a first response value of the RFID tag authentication server 300 are the same as the first challenge value and the first response value of the RFID tag.

The storage unit 320 of the RFID tag authentication server 300 stores therein IDs of one or more RFID tags, a first challenge value designated to each RFID tag and a first response value corresponding to the first challenge value. The first challenge value is shared by each RFID tag and the RFID tag authentication server 300 and is used by the RFID tag authentication server 300 to identify each RFID tag. According to the example embodiment, in order to prevent the first challenge value from being exposed to hackers, the storage unit 320 previously stores the first challenge value which is encrypted with the ID of the RFID tag and share the stored first challenge value with the RFID tag authentication server 300. The encryption operation includes an XOR operation. This encryption operation is performed to protect the RFID tag by encrypting the ID of the RFID tag by using a new one-time random number all the time, and to allow the RFID tag authentication server 300 to perform a minimum operation to find out the ID of the RFID tag.

Next, the receiving unit 330 of the RFID tag authentication server 300 receives the first challenge value, time information of the RFID tag, an ID of the RFID reader and a first message authentication code from the RFID reader as tag identifiers. At this time, the first challenge value and ID of the RFID tag which are encrypted may be received as the tag identifiers, and the encryption operation may be an XOR operation.

Then, the tag identification unit 340 of the RFID tag authentication server 300 searches the storage unit 320 for the ID of the RFID tag and the first response value matched with the first challenge value. In case that the receiving unit 330 receives the ID of the RFID tag and the first challenge value which are encrypted and if the storage unit 320 has stored thereon ID of the RFID tag ID and the first challenge value which are encrypted, the tag identification unit 340 searches the storage unit 320 for the ID of the RFID tag and the first response value matched with the ID of the RFID tag and the first challenge value which are encrypted.

Next, the MAC processing unit 350 of the RFID tag authentication server 300 generate a seventh message authentication code for the time information of the RFID tag, the ID of the RFID tag and the ID of the RFID reader by using the stored first response value as a secrete key. The same as stated above, the message authentication code generated by the MAC processing unit 350 may be a hash function or a HMAC-based message authentication code.

Then, based on the seventh message authentication code generated by the MAC processing unit 350 and the first message authentication code received by the receiving unit 330, the verification unit 360 determines whether to authenticate the RFID tag by determining whether the two message authentication codes are coincident.

Meanwhile, the RFID tag authentication server 300 may further include the encryption unit 370 and the transmitting unit 380 in order to authenticate the RFID tag authentication server 300 itself to the RFID tag after the authentication of the RFID tag is completed.

The MAC processing unit 350 additionally generates a second message authentication code and a third message authentication code by using the first response value as a secret key. Here, the second message authentication code is a message authentication code for time information of the RFID tag authentication server 300, the time information of the RFID tag, the ID of the RFID tag and the ID of the RFID reader. Further, the third message authentication code is a message authentication code for a second challenge value to be used next. The same stated earlier, each message authentication codes generated by the MAC processing unit 350 may be a hash function or a HMAC-based message authentication code.

Here, the RFID tag authentication server 300 may further include the encryption unit 370 configured to encrypt certain data. The encryption unit 370 encrypts the second challenge value with the second message authentication code generated by using the first response value as a secret key. Here, the encryption unit 370 may encrypt the second message authentication code and the second challenge value by XOR-operating them.

At this time, the transmitting unit 380 transmits, to the RFID reader, the third message authentication code, the time information of the RFID tag authentication server 300 and the second challenge value encrypted with the second message authentication code in the encryption unit 370.

Meanwhile, to update the second response value to the RFID tag authentication server 300, the receiving unit 330 receives a sixth message authentication code for next time information of the RFID tag, the time information of the RFID tag authentication server 300, the ID of the RFID tag and the ID of the RFID reader, and the second response value encrypted with the second challenge value. Here, the encryption operation may be an XOR operation.

The MAC processing unit 350 generates an eighth message authentication code for the next RFID tag time information, the time information of the RFID tag authentication code 300, the ID of the RFID tag and the ID of the RFID reader. The eighth message authentication code may be a hash function or an HMAC-based message authentication code.

The decryption unit restores the second response value encrypted in the RFID tag by using the second challenge value. In case that the second challenge value and the second response value are encrypted by being XOR-operated, the second response value may be restored by XOR-operating the second challenge value to the encrypted second response value.

The verification unit 360 determines whether the sixth message authentication code and the eighth message authentication code are coincident. If they are coincident, the second challenge value and the second response value are updated to the storage unit 320 while being matched with the RFID tag ID.

Figure 3:
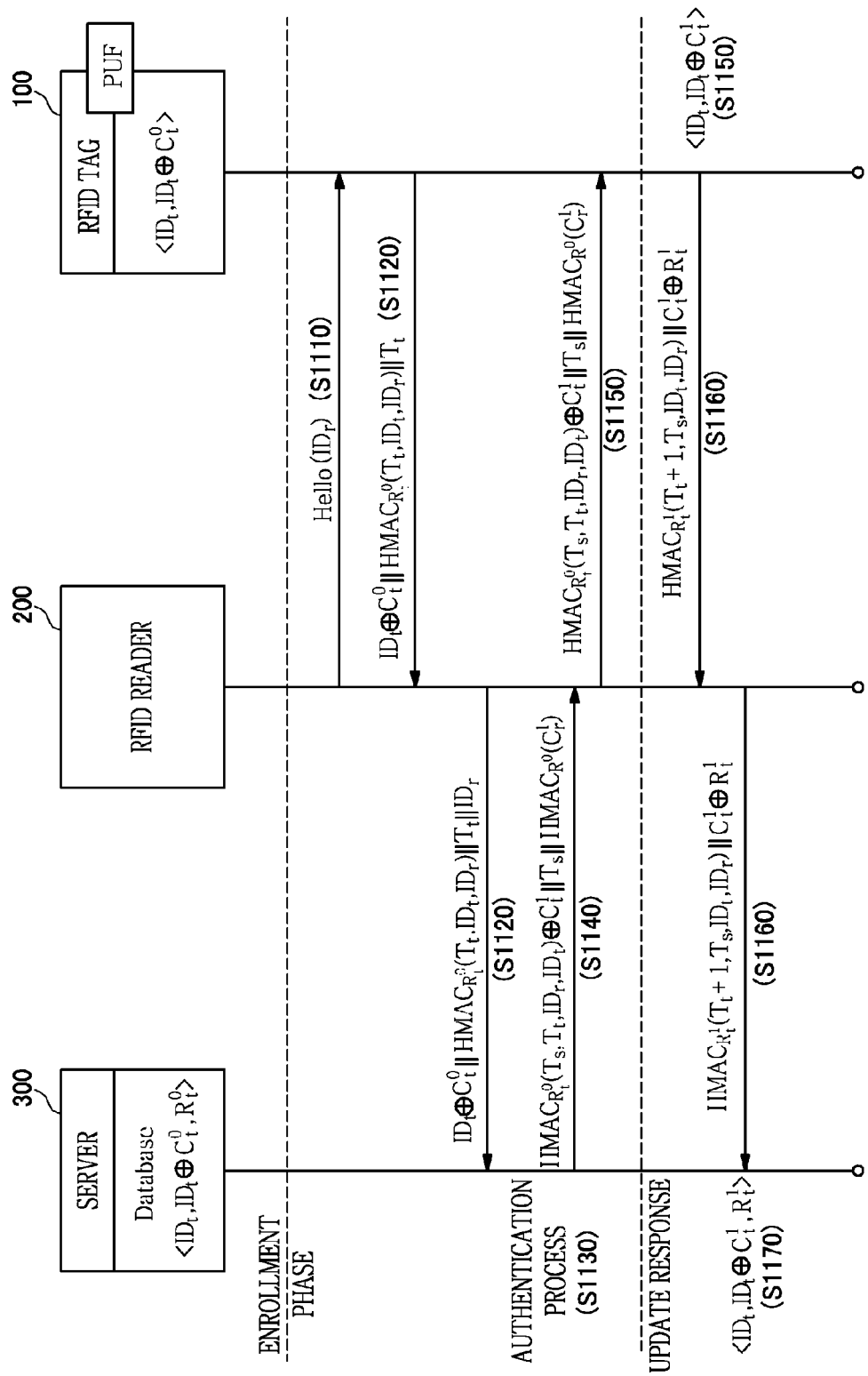
FIG. 3 is a flowchart illustrating a mutual authentication process between the RFID tag, an RFID reader and the RFID tag authentication server.

FIG. 3 is a flowchart illustrating an authentication process between the RFID tag, the RFID reader 200 and the RFID tag authentication server.

First, the RFID authentication server generates a first challenge value, and shares a message code generation function, an ID of the RFID tag, the first challenge value and a first response value corresponding to the first challenge value with the RFID tag.

To read the RFID tag, the RFID reader 200 sends an ID thereof to the RFID tag (S1110). The RFID tag inputs the stored first challenge value to the PUF module and generates the first response value as an output value. The RFID tag transmits, as a tag identifier, the first challenge value or the RFID tag ID encrypted (for example, XOR-operated) with the first challenge value. The challenge value is a value that changes every time when connection is made, and it protects the ID of the tag from hackers. This challenge value is the same as a challenge value of the RFID tag authentication server.

The RFID tag according to the present example embodiment transmits a result value (first message authentication code) of a unidirectional hash function using the first response value as a secret key, the first challenge value and time information of the RFID tag to the RFID tag authentication server through the RFID reader 200 (S1120). The first challenge value may be transmitted by being encrypted (for example, XOR-operated) with the ID of the RFID tag.

The RFID tag authentication server receives the time information of the RFID tag, the first challenge value (or the first challenge value and the RFID tag ID which are encrypted), the ID of the RFID reader 200 and a first message authentication code from the RFID reader 200, and searches for the ID of the RFID tag and the first response value corresponding to the received first challenge value. Then, by using the first response value as a key value of an unidirectional hash function, the RFID tag authentication server generates a seventh message authentication code for the time information of the RFID tag time information, the ID of the RFID tag and the ID of the RFID reader 200.

Then, the RFID tag authentication verifies whether the first message authentication code and the seventh message authentication code are coincident. By verifying the unidirectional hash function in this way, the RFID tag authentication server authenticates the RFID tag (S1130).

After authenticating the RFID tag, the RFID tag authentication server generates a new second challenge value and updates this second challenge value to the storage unit while matching it with the ID of the RFID tag. Further, the RFID tag authentication server transmits an authentication value of the RFID tag authentication server to the RFID tag through the RFID reader 200 (S1140). In order to generate the authentication value, the RFID tag authentication server generates a second message authentication code for the time information of the RFID tag authentication server, the time information of the RFID tag, the ID of the RFID tag and the ID of the RFID reader 200 by using the first response value as a secret key, and, also, generates a third message authentication code for the second challenge value by using the first response value as a secret key. Then, the second challenge value is encrypted with the second message authentication code and transmitted to the RFID reader 200 along with the third message authentication code. Here, an encryption function may be an XOR operation function. The generation of the message authentication codes may be based on a hash function or an HMAC function.

The RFID tag according to the example embodiment receives the second challenge value encrypted with the second message authentication code, and the third message authentication code. Then, the RFID code restores the encrypted second challenge value by using a fourth message authentication code. Furthermore, the RFID tag generates a fifth message authentication code by using the first response value as a secret key, and authenticates the RFID tag authentication server by determining whether the third message authentication code coincides with the fifth message authentication code (S1150).

If the authentication upon the RFID tag authentication server is completed, the RFID tag generates a second response value by using the PUF module and encrypts (for example, XOR-operates) the second response value with the second challenge value in order to update the second response value to the RFID tag authentication server. Then, the RFID tag transmits the encryption result value and an eighth message authentication code to the RFID tag authentication server through the RFID reader 200 (S1160). The eighth message authentication code is a message authentication code generated for next time information of the RFID tag, the time information of the RFID tag, the ID of the RFID tag and the ID of the RFID reader 200 by using the second response value as a secret key.

Then, the RFID authentication server verifies the eighth message authentication code and stores the ID of the RFID tag, the second challenge value and the second response value (S1). Here, according to the example embodiment, the second challenge value may be stored after encrypted (for example, XOR-operated) with the RFID tag ID.

As stated above, the example embodiment provides a method capable of preventing the ID of the RFID server from being exposed and, also, capable of minimizing an operation amount of the RFID tag authentication server while guaranteeing the privacy of the RFID tag. Furthermore, by providing a technique whereby the RFID tag and the RFID tag authentication server mutually authenticates each other, it is possible to resolve the conventional problems in performance that the ID of the RFID tag is exposed and the RFID tag authentication server has to perform unidirectional hash operation twice as many times as the number of the RFID tags registered on the RFID tag authentication server to find the ID of the RFID tag.

For reference, each of the constituent components shown in FIG. 1 and FIG. 2 according to the example embodiment of the present disclosure may imply software or hardware such as a field programmable gate array (FPGA) or an application specific integrated circuit (ASIC), and they carry out predetermined functions.

However, the components are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables and the like.

The components and functions thereof can be combined with each other or can be divided.

The example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The authentication method of the RFID tag authentication server according to the above-described example embodiments may be realized as a computer readable code on a computer readable recording medium. The computer readable recording medium includes all kinds of storage devices storing data that can be read by a computer system. For example, there are a read only memory (ROM), a random access memory (RAM), a magnetic tape, a magnetic disk, a flash memory, an optical data storage device and others. In addition, the computer readable recording medium may be distributed on a computer system connected through a computer communication network, to be stored and executed as a code that can be read in a distributed manner The method and the system of the present disclosure have been described with respect to the example embodiment. However, a part or all of the constituent parts or operations of the present disclosure may be implemented by using a computer system having general-purpose hardware architecture.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A radio frequency identification (RFID) tag using a physically unclonable function (PUF), comprising: a PUF module configured to generate a response value corresponding to a challenge value; a storage unit having stored thereon an ID of the RFID tag and a first challenge value; a receiving unit configured to receive an ID of a RFID reader from the RFID reader; a media access control processing unit configured to generate a first message authentication code for the ID of the RFID reader, the ID of the RFID tag and time information of the RFID tag by using a first response value corresponding to the first challenge value as a secret key; a transmitting unit configured to transmit the first challenge value, the first message authentication code and the time information of the RFID tag as tag identifiers to the RFID reader if the receiving unit receives the ID of the RFID reader; and an encryption unit configured to encrypt the first challenge value and the ID of the RFID tag by XOR-operating the first challenge value and the ID of the RFID tag, wherein the RFID tag shares a message authentication code generation function, the ID of the RFID tag, the first challenge value and the first response value generated by the PUF module with an RFID tag authentication server, the RFID tag authentication server authenticates the RFID tag based on information received from the RFID reader, the first challenge value is changed every time the authentication is performed, and the first challenge value and the ID of the RFID tag, which are encrypted in the encryption unit, are transmitted to the RFID reader as the tag identifiers; a decryption unit configured to restore encrypted data; and a verification unit configured to determine whether a message authentication code received from the RFID tag authentication server coincides with a message authentication code generated by the media access control processing unit, wherein the receiving unit additionally receives a second challenge value encrypted with a second message authentication code in the RFID tag authentication server, a third message authentication code and time information of the RFID tag authentication server from the RFID reader, the media access control processing unit generates a fourth message authentication code for the time information of the RFID tag, the ID of the RFID reader, the ID of the RFID tag and the time information of the RFID tag authentication server received from the RFID reader by using the first response value as the secret key, the decryption unit restores, by using the fourth message authentication code, an original second challenge value from the second challenge value encrypted with the second message authentication code by the RFID tag authentication server, the media access control processing unit generates a fifth message authentication code for the restored second challenge value by using the first response value as the secret key, the verification unit determines whether the third message authentication code and the fifth message authentication code are coincident, and, if so, updates the second challenge value to the storage unit while matching the second challenge value with the ID of the RFID tag, the second message authentication code is generated for the time information of the RFID tag authentication server, the time information of the RFID tag, the ID of the RFID reader and the ID of the RFID tag by using the first response value as the secret key, and the third message authentication is generated for the second challenge value code by using the first response value as the secret key.

2. The RFID tag of claim 1, further comprising: an encryption unit configured to encrypt a second response value by using the second challenge value, wherein the PUF module generates the second response value corresponding to the second challenge value, the media access control processing unit generates a sixth message authentication code for next time information (Tt+1) of the RFID tag, the time information of the RFID tag authentication server, the ID of the RFID reader and the ID of the RFID tag by using the second response value generated by the PUF module as the secret key, and the transmitting unit transmits the sixth message authentication code and the second response value encrypted with the second challenge value in the encryption unit to the RFID reader.

3. The RFID tag of claim 1, wherein the decryption unit restores the original second challenge value from the second challenge value, which is encrypted with the second message authentication code by the RFID tag authentication server, by XOR(exclusive OR)-operating the fourth message authentication code, and the encryption unit encrypts the second challenge value and the second response value by XOR-operating the second challenge value and the second response value.

4. The RFID tag of claim 1, wherein the storage unit previously stores therein the first challenge value and the ID of the RFID tag which are encrypted and shared with the RFID tag authentication server.

5. The RFID tag of claim 3, wherein the storage unit previously stores therein the first challenge value and the ID of the RFID tag which are XOR-operated, and the transmitting unit additionally transmits the encryption result values to the RFID reader.

6. A radio frequency identification (RFID) tag authentication server, comprising: a storage unit having stored thereon an ID of an RFID tag, a first challenge value and a first response value corresponding to the first challenge value; a receiving unit configured to receive the first challenge value, time information of the RFID tag, an ID of an RFID reader and a first message authentication code from the RFID reader as tag identifiers, wherein the received first challenge value and the ID of the RFID tag are encrypted in an encryption unit of the RFID tag by XOR-operating the first challenge value and the ID of the RFID tag; a tag identification unit configured to search the storage unit for the ID of the RFID tag and the first response value matched with the first challenge value; a MAC media access control processing unit configured to generate a seventh message authentication code for the ID of the RFID reader, the ID of the RFID tag and time information of the RFID tag by using the first response value as a secret key; and a verification unit configured to determine whether the seventh message authentication code and the first message authentication code are coincident, wherein the first message authentication code is a message authentication code generated for the ID of the RFID reader, the ID of the RFID tag and the time information of the RFID tag by using the first response value as the secret key, and the RFID tag authentication server shares a message authentication code generation function, the ID of the RFID tag, the first challenge value and the first response value with the RFID tag, and the first challenge value is a value changed every time the authentication is performed; a decryption unit configured to restore encrypted data; and the verification unit configured to determine whether a message authentication code received from the RFID tag authentication server coincides with a message authentication code generated by the media access control processing unit, wherein the receiving unit additionally receives a second challenge value encrypted with a second message authentication code in the RFID tag authentication server, a third message authentication code and time information of the RFID tag authentication server from the RFID reader, the media access control processing unit generates a fourth message authentication code for the time information of the RFID tag, the ID of the RFID reader, the ID of the RFID tag and the time information of the RFID tag authentication server received from the RFID reader by using the first response value as the secret key, the decryption unit restores, by using the fourth message authentication code, an original second challenge value from the second challenge value encrypted with the second message authentication code by the RFID tag authentication server, the media access control processing unit generates a fifth message authentication code for the restored second challenge value by using the first response value as the secret key, the verification unit determines whether the third message authentication code and the fifth message authentication code are coincident, and, if so, updates the second challenge value to the storage unit while matching the second challenge value with the ID of the RFID tag, the second message authentication code is generated for the time information of the RFID tag authentication server, the time information of the RFID tag, the ID of the RFID reader and the ID of the RFID tag by using the first response value as the secret key, and the third message authentication is generated for the second challenge value code by using the first response value as the secret key.

7. The RFID tag authentication server of claim 6 further comprising: an encryption unit configured to encrypt preset data; and a transmitting unit configured to transmit the preset data to the RFID reader, wherein the media access control processing unit additionally generates the second message authentication code and the third message authentication code by using the first response value as the secret key, the encryption unit encrypts the second message authentication code and the second challenge value, the transmitting unit transmits the third message authentication code, time information of the RFID tag authentication server and the second message authentication code encrypted in the encryption unit to the RFID reader, the second message authentication code is a message authentication code for the time information of the RFID tag authentication server, the time information of the RFID tag, the ID of the RFID tag and the ID of the RFID reader, and the third message authentication code is a message authentication code for the second challenge value to be used next.

8. The RFID tag authentication server of claim 7, wherein the encryption unit encrypts the second message authentication code and the second challenge value by XOR-operating the second message authentication code and the second challenge value.

9. The RFID tag authentication server of claim 6, wherein the storage unit previously stores therein the ID of the RFID tag and the first challenge value which are encrypted, the receiving unit receives the ID of the RFID tag and the first challenge value, which are encrypted, from the RFID reader as the tag identifiers, and the tag identification unit searches the storage unit for the first response value and the ID of the RFID tag matched with the ID of the RFID tag and the first challenge value which are encrypted.

10. The RFID tag authentication server of claim 7, further comprising: the decryption unit configured to restore preset data into original data, wherein the receiving unit receives a sixth message authentication code for next time information (Tt+1) of the RFID tag, the time information of the RFID tag authentication server, the ID of the RFID tag and the ID of the RFID reader, and the second response value encrypted with the second challenge value, the decryption unit restores the second response value encrypted with the second challenge value, the MAC media access control processing unit generates an eighth message authentication code for the next time information of the RFID tag, the time information of the RFID tag authentication server, the ID of the RFID tag and the ID of the RFID reader by using the restored second response value as the secret key, and the verification unit determines whether the sixth message authentication code and the eighth message authentication code are coincident, and, if so, updates the second challenge value and the second response value to the storage unit while matching the second challenge value and the second response value with the ID of the RFID tag.

11. An authentication method of authenticating a radio frequency identification (RFID) tag by an RFID tag authentication server, the method comprising: generating a first challenge value; sharing a message authentication code generation function, an ID of the RFID tag, the first challenge value and a first response value corresponding to the first challenge value between the RFID tag authentication server and the RFID tag; receiving time information of the RFID tag, the first challenge value, an ID of an RFID reader and a first message authentication code from the RFID reader, wherein the received first challenge value and the ID of the RFID tag are encrypted in an encryption unit of the RFID tag by XOR-operating the first challenge value and the ID of the RFID tag; generating a seventh message authentication code for the time information of the RFID tag, the ID of the RFID tag and the ID of the RFID reader by using the first response value as a secret key; and determining whether to authenticate the RFID tag based on whether the generated seventh message authentication code and the received message authentication code are coincident, wherein the first message authentication code is a message authentication code generated for the ID of the RFID reader, the ID of the RFID tag and the time information of the RFID tag by using the first response value as a secret value, and the first challenge value is a value changed every time the authentication is performed; a decryption unit configured to restore encrypted data; and a verification unit configured to determine whether a message authentication code received from the RFID tag authentication server coincides with a message authentication code generated by the media access control processing unit, wherein the receiving unit additionally receives a second challenge value encrypted with a second message authentication code in the RFID tag authentication server, a third message authentication code and time information of the RFID tag authentication server from the RFID reader, the media access control processing unit generates a fourth message authentication code for the time information of the RFID tag, the ID of the RFID reader, the ID of the RFID tag and the time information of the RFID tag authentication server received from the RFID reader by using the first response value as the secret key, the decryption unit restores, by using the fourth message authentication code, an original second challenge value from the second challenge value encrypted with the second message authentication code by the RFID tag authentication server, the media access control processing unit generates a fifth message authentication code for the restored second challenge value by using the first response value as the secret key, the verification unit determines whether the third message authentication code and the fifth message authentication code are coincident, and, if so, updates the second challenge value to the storage unit while matching the second challenge value with the ID of the RFID tag, the second message authentication code is generated for the time information of the RFID tag authentication server, the time information of the RFID tag, the ID of the RFID reader and the ID of the RFID tag by using the first response value as the secret key, and the third message authentication is generated for the second challenge value code by using the first response value as the secret key.

12. The authentication method of claim 11, further comprising: additionally generating the second challenge value to be used next if the authentication of the RFID tag is determined; updating the second challenge value to the RFID tag authentication server while matching the second challenge value with the ID of the RFID tag, and generating the second message authentication code and the third message authentication code by using the first response value as the secret key, encrypting the second challenge value with the second message authentication code; and transmitting the third message authentication code, the time information of the RFID tag authentication server and the encrypted second challenge value to the RFID reader, wherein the second message authentication code is a message authentication code for time information of the RFID tag authentication server, the time information of the RFID tag, the ID of the RFID tag and the ID of the RFID reader, and the third message authentication code is a message authentication code for the second challenge value to be used next.

13. The authentication method of claim 12, further comprising: receiving a sixth message authentication code for next time information (Tt+1) of the RFID tag, the time information of the RFID tag authentication server, the ID of the RFID tag and the ID of the RFID reader, and the second response value encrypted with the second challenge value, restoring the second response value encrypted with the second challenge value, generating an eighth message authentication code for the next time information of the RFID tag, the time information of the RFID tag authentication server, the ID of the RFID tag and the ID of the RFID reader by using the restored second response value as the secret key, and determining whether the sixth message authentication code and the eighth message authentication code are coincident, and, if so, updates the second challenge value and the second response value to the a storage unit of the RFID tag authentication server while matching the second challenge value and the second response value with the ID of the RFID tag.

* * * * *